United States Patent

[11] 3,601,644

| [72] | Inventor | Silvano Perlino<br>Pavia, Italy |
|---|---|---|
| [21] | Appl. No. | 885,829 |
| [22] | Filed | Dec. 17, 1969 |
| [45] | Patented | Aug. 24, 1971 |
| [73] | Assignee | Necchi Societa per Axioni<br>Pavia, Italy |
| [32] | Priority | Dec. 19, 1968 |
| [33] | | Italy |
| [31] | | 32422/A68 |

[54] SPEED REGULATION DEVICE FOR SWING MACHINE MOTORS
2 Claims, 2 Drawing Figs.

[52] U.S. Cl. ................................................. 310/241
[51] Int. Cl. ................................................. H02k 13/00
[50] Field of Search ................................. 310/241,
239, 242; 112/219; 318/55, 59, 86

[56] References Cited
UNITED STATES PATENTS

| 1,927,176 | 9/1933 | Langley | 310/241 |
|---|---|---|---|
| 2,099,554 | 11/1937 | Bean | 310/241 |
| 2,737,605 | 3/1956 | Wagner | 310/241 |
| 2,774,925 | 12/1956 | Wagner | 310/241 |
| 3,358,628 | 12/1967 | Kosrow | 112/219 |
| 3,367,296 | 2/1968 | Harruff | 112/219 |
| 3,440,465 | 4/1969 | Pratt | 310/241 |
| 3,480,813 | 11/1969 | Sillano | 310/241 |

*Primary Examiner*—Milton O. Hirshfield
*Assistant Examiner*—R. Skudy
*Attorney*—Stevens, Davis, Miller and Mosher

ABSTRACT: The invention relates to a device which permits the operator of a home-type sewing machine to regulate the speed thereof. The machine motor is of the commutator-type and is provided with a hand-manipulable knob member for varying the brush holder position.

PATENTED AUG 24 1971
3,601,644
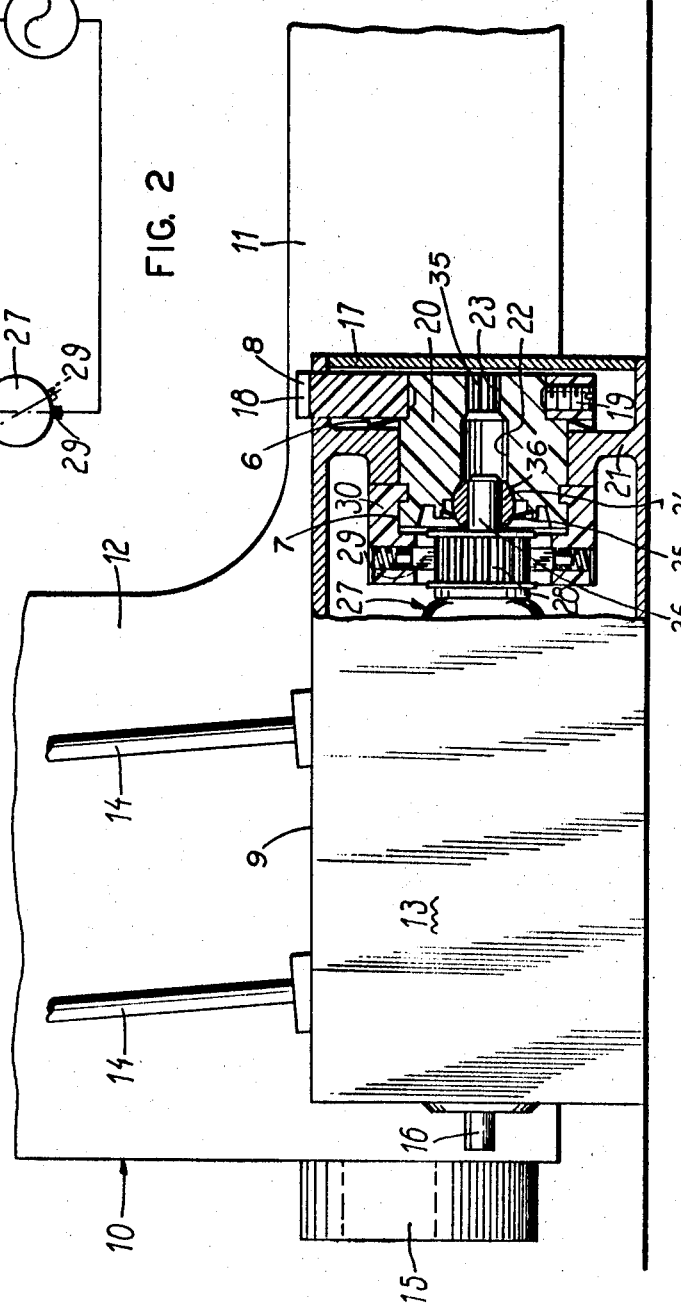
INVENTOR
SILVANO PERLINO
BY
*Stevens, Davis, Miller & Mosher*
ATTORNEYS

SPEED REGULATION DEVICE FOR SEWING MACHINE MOTORS

This invention relates to a manual means for controlling the shaft speed of an electric, commutator-type motor and is especially applicable to motors which drive home-type sewing machines.

Foot operated treadles are commonly employed for regulating sewing machine speed, the operator pressing upon the treadle or pedal to any of various positions thereof each corresponding to a different motor driving speed; however, such treadles incorporate various disadvantages, especially as to continuous speed regulation over a long period of time, among which disadvantages are the following:

the treadle type devices involve a relative high consumption of electric power which is dissipated in the form of heat;

such heat is pernicious to the durability of the treadle itself as well as being uncomfortable and actually harmful to the operator's foot;

such discomfort to the operator's foot resulting in the operator finding it difficult to maintain its foot steadily in contact with said treadle thereby resulting in an erratic maintenance of the desired sewing machine speed.

In order to overcome these disadvantages, other regulators are known which automatically maintain a desired sewing machine speed despite influences which tend to either accelerate or decelerate the machine speed. Such known regulators, however, rely upon the use of rather complex electronic circuits and devices which are expensive and therefore inconsistent with the present trend towards simplification and lowering of costs in this field.

It is an object of this invention, therefore, to provide a simple and inexpensive means for regulating sewing machine speed, such means coming into effect when the foot-operated treadle is short-circuited after having performed its starting function and its function of bringing the machine up to operating speed.

A further object of this invention is that of providing such a means as aforementioned and which is manually operable and easily accessible to the machine operator.

A further object of this invention is that of providing a speed regulation device as aforementioned and which is durable and highly reliable and effective in maintaining any particular speed over a long period of time.

Other objects are those which are inherent in the invention as disclosed herein.

Generally, the present invention relies upon the known expedient of varying the torque and thereby the speed of a commutator-type electric motor by varying the angularity of the brush axis. In this regard, it is well known that the highest torque and therefore the highest motor shaft speed occurs when the axis of the induction poles is perpendicular to the axis of the induced poles and that the torque is a function of the cosine of the complement of the angle between these axes when that angle is other than a right angle.

Accordingly, the present invention employs the foregoing known features of commutator-type motors with the addition of an easily accessible manipulatable means whereby the machine operator may manually vary the angularity between said axes. This is realized in the invention through the provision of a rotatable brush holder which is rigidly connected to a rotatable body, both of which are coaxially rotatable about the motor axis between two extreme positions corresponding respectively to highest and lowest torque and speed conditions.

The foregoing will be readily apparent from the following detailed description of a preferred embodiment of realization of the invention which is referred to the accompanying drawing, wherein:

FIG. 1 is a partial view of a sewing machine incorporating a speed regulator according to this invention; and, FIG. 2 is an electrical diagram of a motor employing the regulator means according to this invention.

A home sewing machine 10 comprises a horizontal arm 11 extending in cantilever fashion from an upright standard 12, and a cast housing 13 joined to the standard and enclosing the driving motor 27. Spool holders 14 are fixed to the upper flat surface 9 of the housing. Numbers 15 and 16 respectively indicate the machine handwheel and bobbin winder pin support.

One end of housing 13, opposite to said support 16, is closed by end plate 17 and the device according to this invention is enclosed within said housing adjacent to said plate. Said device comprises a cylindrical body 20 freely rotatably mounted within a cavity 7 defined within portion 21 of said housing 13. Said body 20 in turn includes a central axial bore 22 which merges at one end thereof into a bore 23 having axially extending grooves 35 along its wall, and said bore 22 merges at its opposite end into an enlargement cavity 36 defining a seat for a spherical bushing 24 which rotatably supports one end of the motor shaft 26. An elastic ring 25 serves to keep the bushing within cavity 36.

The motor 27 comprises a commutator 28 fixed to the motor shaft 26 and around which is rotatably mounted a brush holder 30 carrying the opposed brushes 29. Said holder 30 is fixedly attached to the cylindrical body 20 whereby both are jointly rotatable about the motor shaft axis. A knob member 18 is itself fixedly attached about one end of the body 20 by means of setscrew 19, said knob having a knurled portion 8 projecting radially outwardly through an opening in housing 13 so as to be accessible to the machine operator who, through manipulation of said portion 8, may easily rotate said body 20 and the thereto attached holder 30 between respective extreme angular positions thereof as illustrated in FIG. 2.

With reference to FIG. 2, it is seen that the motor 27 is connected through excitation winding 31 and foot treadle control means 32 with a source of alternating current 33. Prior to knob 18 being secured to body 20 by screw 19, the body and brush holder 30 are set in a position corresponding to the brush axis being at a position of maximum torque whereupon said screw is tightened to fix the knob 18 relative to the body 20. A plus (+) mark is provided on a portion of casing 13 in order to indicate this position. Correspondingly, a minus (−) mark is provided on another portion of housing 13 to indicate the position of lesser torque and an appropriate index mark is provided on the visible portion of knob 18 so that the operator may easily align the index mark with ether the plus or minus marks on the casing or position said index mark at any point between said plus and minus marks, as is in fact the situation in FIG. 2.

Means may also be provided in order to restrict the rotational travel of knob 18 between said plus and minus marks. Further, in order to prevent unwanted rotation of knob 18 caused by vibrations, a ring-shaped elastic friction element 6 is positioned between housing 13 and an adjacent surface of knob 18, said element 6 exerting a restraining force against said knob.

Various details presented herein of a preferred embodiment of realization of the invention are illustrative and not limitative of the disclosed inventive concept, it being understood that various modifications of such details may be effected without departing from such inventive concept.

What I claim is:

1. A driving motor of the commutator-type for sewing machines, comprising a housing, a commutator and rotatable brush holder within said housing, a motor shaft having an end proximate to said holder, a handle means extending outwardly of said housing, a cylindrical body having opposite ends, said handle being fixedly attached to one of said opposite ends and said holder being fixedly attached to the other of said opposite ends, said holder and handle, and body being integrally rotatable together about the rotational axis of the motor shaft, a spherical bearing means carried by said body along the rotational axis thereof, said shaft end being supported in said bearing means.

2. The motor of claim 1, said body comprising a central axial bore having axially extending grooves along its wall, said grooves being adapted to permit setting of the angular position of said holder independently of said handle means, said handle means being releasedly secured to said body.